US012663501B2

(12) United States Patent
Aduru et al.

(10) Patent No.:  US 12,663,501 B2
(45) Date of Patent:      Jun. 23, 2026

(54) ADAPTIVE BANDWIDTH USAGE AT RADAR CONGESTION FOR OFDM SYSTEMS

(71) Applicant: Telefonaktiebolaget LM Ericsson (PUBL), Stockholm (SE)

(72) Inventors: Vinod Aduru, Nellore Andhra Pradesh (IN); David Ottosson, Karlstad (SE); Roland Smith, Nepean (CA)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 505 days.

(21) Appl. No.: 17/595,232

(22) PCT Filed: May 24, 2019

(86) PCT No.: PCT/SE2019/050479
§ 371 (c)(1),
(2) Date: Nov. 11, 2021

(87) PCT Pub. No.: WO2020/242351
PCT Pub. Date: Dec. 3, 2020

(65) Prior Publication Data
US 2022/0317241 A1       Oct. 6, 2022

(51) Int. Cl.
*G01S 7/02*          (2006.01)
*H04W 16/14*       (2009.01)

(52) U.S. Cl.
CPC ............. *G01S 7/023* (2013.01); *H04W 16/14* (2013.01)

(58) Field of Classification Search
CPC .......... H04W 16/14; G01S 7/23; G01S 7/023; G01S 7/0235; G01S 7/0232

USPC ........................... 370/329, 350; 342/175, 59
See application file for complete search history.

(56) References Cited

U.S. PATENT DOCUMENTS

| | | | | |
|---|---|---|---|---|
| 6,831,589 B2 * | 12/2004 | Shearer, III | ............. | G01S 7/021 455/67.11 |
| 7,035,661 B1 * | 4/2006 | Yun | ........................ | H04W 52/42 455/562.1 |
| 7,231,215 B2 * | 6/2007 | Lewis | ................... | H04W 36/06 455/434 |
| 7,545,308 B2 * | 6/2009 | Mitsugi | ................... | G01S 7/023 342/52 |
| 7,764,218 B2 * | 7/2010 | Kruys | ..................... | G01S 7/021 342/13 |

(Continued)

FOREIGN PATENT DOCUMENTS

| | | | | |
|---|---|---|---|---|
| ES | 2391502 T3 * | 11/2012 | ......... | H04L 25/0202 |
| WO | 2018 177788 A1 | 10/2018 | | |

OTHER PUBLICATIONS

PCT International Search Report issued for International application No. PCT/SE2019/050479—Feb. 25, 2020.

(Continued)

*Primary Examiner* — Michael W Justice
(74) *Attorney, Agent, or Firm* — Baker Botts L.L.P.

(57) ABSTRACT

According to certain embodiments, a method performed by a network node includes detecting a radar signal in at least one subchannel within a plurality of subchannels within an operating channel. In response to detecting the radar signal in the at least one subchannel, transmission of at least one signal is scheduled in at least one subchannel within the plurality of subchannels other than the at least one subchannel in which the radar signal was detected.

14 Claims, 16 Drawing Sheets

(56)          References Cited

U.S. PATENT DOCUMENTS

| | | | | |
|---|---|---|---|---|
| 7,974,299 | B1* | 7/2011 | Banerjea | H04W 40/04 370/431 |
| 7,986,966 | B2* | 7/2011 | Sekiya | G01S 7/021 370/479 |
| 8,064,944 | B2* | 11/2011 | Yun | H04W 52/42 455/67.11 |
| 8,145,207 | B2* | 3/2012 | Hwang | H04B 1/1027 370/332 |
| 8,180,392 | B2* | 5/2012 | Sekiya | G01S 7/021 370/479 |
| 8,379,583 | B2* | 2/2013 | Gorokhov | H04L 5/0037 375/135 |
| 8,427,588 | B2* | 4/2013 | Kimura | H04N 21/4147 348/731 |
| 8,542,698 | B1* | 9/2013 | Banerjea | H04L 49/90 370/431 |
| 8,836,601 | B2* | 9/2014 | Sanford | H01Q 1/525 343/837 |
| 8,861,541 | B1* | 10/2014 | Banerjea | H04L 47/122 370/431 |
| 8,923,844 | B2* | 12/2014 | van Rensburg | H04W 72/52 455/24 |
| 9,036,573 | B2* | 5/2015 | Li | H04W 16/32 370/437 |
| 9,055,592 | B2* | 6/2015 | Clegg | H04W 40/22 |
| 9,307,413 | B2* | 4/2016 | Lenzini | H04W 16/14 |
| 9,374,133 | B2* | 6/2016 | Eriksson | H04B 3/32 |
| 9,490,533 | B2* | 11/2016 | Sanford | H01Q 15/14 |
| 9,585,109 | B2* | 2/2017 | Kalkunte | H04W 74/0816 |
| 9,602,256 | B2* | 3/2017 | Xiao | H04W 72/27 |
| 9,635,649 | B1* | 4/2017 | Amiri | H04W 72/20 |
| 9,730,205 | B2* | 8/2017 | Li | H04W 72/23 |
| 9,860,762 | B2* | 1/2018 | Kalkunte | H04W 56/002 |
| 9,877,330 | B2* | 1/2018 | Shapira | H04W 72/542 |
| 9,894,534 | B2* | 2/2018 | Boudreau | H04W 16/14 |
| 9,918,322 | B2* | 3/2018 | Sharma | H04W 28/16 |
| 9,924,518 | B2* | 3/2018 | Yi | H04W 16/10 |
| 9,930,670 | B2* | 3/2018 | Yi | H04W 4/021 |
| 10,158,999 | B2* | 12/2018 | Mody | G01S 7/023 |
| 10,212,605 | B2* | 2/2019 | Teng | H04W 72/0453 |
| 10,374,749 | B1* | 8/2019 | Kulkarni | H04B 17/345 |
| 10,375,581 | B2* | 8/2019 | Boudreau | H04W 72/0453 |
| 10,397,793 | B2* | 8/2019 | Sadek | H04B 1/50 |
| 10,455,564 | B2* | 10/2019 | Kalkunte | H04W 28/18 |
| 10,473,753 | B2* | 11/2019 | Fischer | G01S 13/88 |
| 10,531,472 | B2* | 1/2020 | Martin | H04W 72/541 |
| 10,582,404 | B2* | 3/2020 | Rashid | H04W 88/10 |
| 10,674,379 | B2* | 6/2020 | Kalkunte | H04W 24/02 |
| 10,698,081 | B2* | 6/2020 | Wallstedt | H04K 3/822 |
| 10,716,134 | B2* | 7/2020 | Gulati | H04W 72/1263 |
| 10,812,985 | B2* | 10/2020 | Mody | H04L 5/0091 |
| 11,006,460 | B2* | 5/2021 | Chee | H04B 1/0458 |
| 11,096,151 | B2* | 8/2021 | Jung | H04K 3/226 |
| 11,137,475 | B2* | 10/2021 | Yankevich | G01S 7/03 |
| 11,252,785 | B2* | 2/2022 | Morioka | H04W 72/23 |
| 11,385,321 | B2* | 7/2022 | Lin | G01S 7/0232 |
| 2003/0152046 | A1* | 8/2003 | Kawai | H04W 72/02 370/348 |
| 2004/0146022 | A1* | 7/2004 | Lewis | H04W 36/06 455/436 |
| 2005/0162304 | A1* | 7/2005 | Mitsugi | H04K 3/822 342/159 |
| 2007/0173277 | A1* | 7/2007 | Yun | H04W 52/42 455/522 |
| 2009/0061780 | A1* | 3/2009 | Sekiya | G01S 7/021 455/63.1 |
| 2009/0160696 | A1* | 6/2009 | Pare | H04K 3/226 342/20 |
| 2010/0060801 | A1* | 3/2010 | Kimura | H04N 21/4122 348/732 |
| 2010/0150084 | A1* | 6/2010 | Joko | H04W 72/23 370/329 |
| 2010/0195600 | A1* | 8/2010 | Gorokhov | H04L 5/0003 370/329 |
| 2010/0225530 | A1* | 9/2010 | Lin | G01S 7/023 342/175 |
| 2011/0267958 | A1* | 11/2011 | Sekiya | G01S 7/021 370/241 |
| 2011/0292890 | A1* | 12/2011 | Kulkarni | H04W 72/27 455/450 |
| 2011/0306377 | A1* | 12/2011 | Shibuya | H04W 72/541 455/517 |
| 2012/0127865 | A1* | 5/2012 | Nakae | H04W 72/541 370/337 |
| 2012/0258749 | A1* | 10/2012 | Lenzini | H04W 16/14 455/509 |
| 2013/0231148 | A1* | 9/2013 | Ganapathi | H04B 15/00 455/501 |
| 2013/0235809 | A1* | 9/2013 | Li | H04W 72/23 370/329 |
| 2014/0218255 | A1* | 8/2014 | Sanford | H01Q 15/16 343/837 |
| 2014/0254494 | A1* | 9/2014 | Clegg | H04W 72/541 370/329 |
| 2014/0269671 | A1* | 9/2014 | Kalkunte | H04W 28/18 370/350 |
| 2014/0293895 | A1* | 10/2014 | Lin | H04L 5/0053 370/329 |
| 2014/0307639 | A1* | 10/2014 | Jung | H04W 72/23 370/329 |
| 2014/0314013 | A1* | 10/2014 | Xiao | H04W 72/27 370/329 |
| 2014/0355532 | A1* | 12/2014 | Shapira | H04W 72/542 370/329 |
| 2015/0002357 | A1* | 1/2015 | Sanford | H01Q 15/16 343/836 |
| 2015/0049691 | A1* | 2/2015 | Hederstierna | H04W 56/001 370/329 |
| 2015/0257136 | A1* | 9/2015 | Li | H04L 5/0048 370/329 |
| 2015/0264589 | A1* | 9/2015 | Kalkunte | H04W 56/002 370/329 |
| 2015/0296508 | A1 | 10/2015 | Fan et al. | |
| 2015/0341939 | A1* | 11/2015 | Sharma | H04W 72/542 370/329 |
| 2016/0157103 | A1* | 6/2016 | Teng | H04W 72/541 370/329 |
| 2016/0255638 | A1* | 9/2016 | Martin | H04L 5/0053 370/329 |
| 2017/0208474 | A1* | 7/2017 | Mody | G01S 7/003 |
| 2017/0238285 | A1* | 8/2017 | Kalkunte | H04W 74/0816 370/329 |
| 2017/0245280 | A1* | 8/2017 | Yi | H04K 3/00 |
| 2017/0257773 | A1* | 9/2017 | Boudreau | H04W 16/14 |
| 2017/0273084 | A1* | 9/2017 | Yi | H04L 5/0062 |
| 2018/0139621 | A1* | 5/2018 | Boudreau | G01S 7/021 |
| 2018/0184308 | A1* | 6/2018 | Kalkunte | H04W 56/002 |
| 2018/0199342 | A1* | 7/2018 | Rai | H04K 3/226 |
| 2018/0242182 | A1* | 8/2018 | Rashid | H04W 88/06 |
| 2018/0359730 | A1* | 12/2018 | Jung | H04K 3/822 |
| 2019/0007180 | A1* | 1/2019 | Shi | H04L 5/0007 |
| 2019/0195985 | A1* | 6/2019 | Lin | G01S 7/0233 |
| 2019/0223213 | A1* | 7/2019 | Chee | H04B 1/525 |
| 2019/0254059 | A1* | 8/2019 | Gulati | H04W 72/542 |
| 2020/0053829 | A1* | 2/2020 | Morioka | H04W 84/12 |
| 2020/0110152 | A1* | 4/2020 | Yankevich | G01S 13/24 |
| 2020/0187013 | A1* | 6/2020 | Mody | H04J 13/0062 |

OTHER PUBLICATIONS

PCT Written Opinion of the International Searching Authority issued for International application No. PCT/SE2019/050479—Feb. 25, 2020.

* cited by examiner

2400

2500

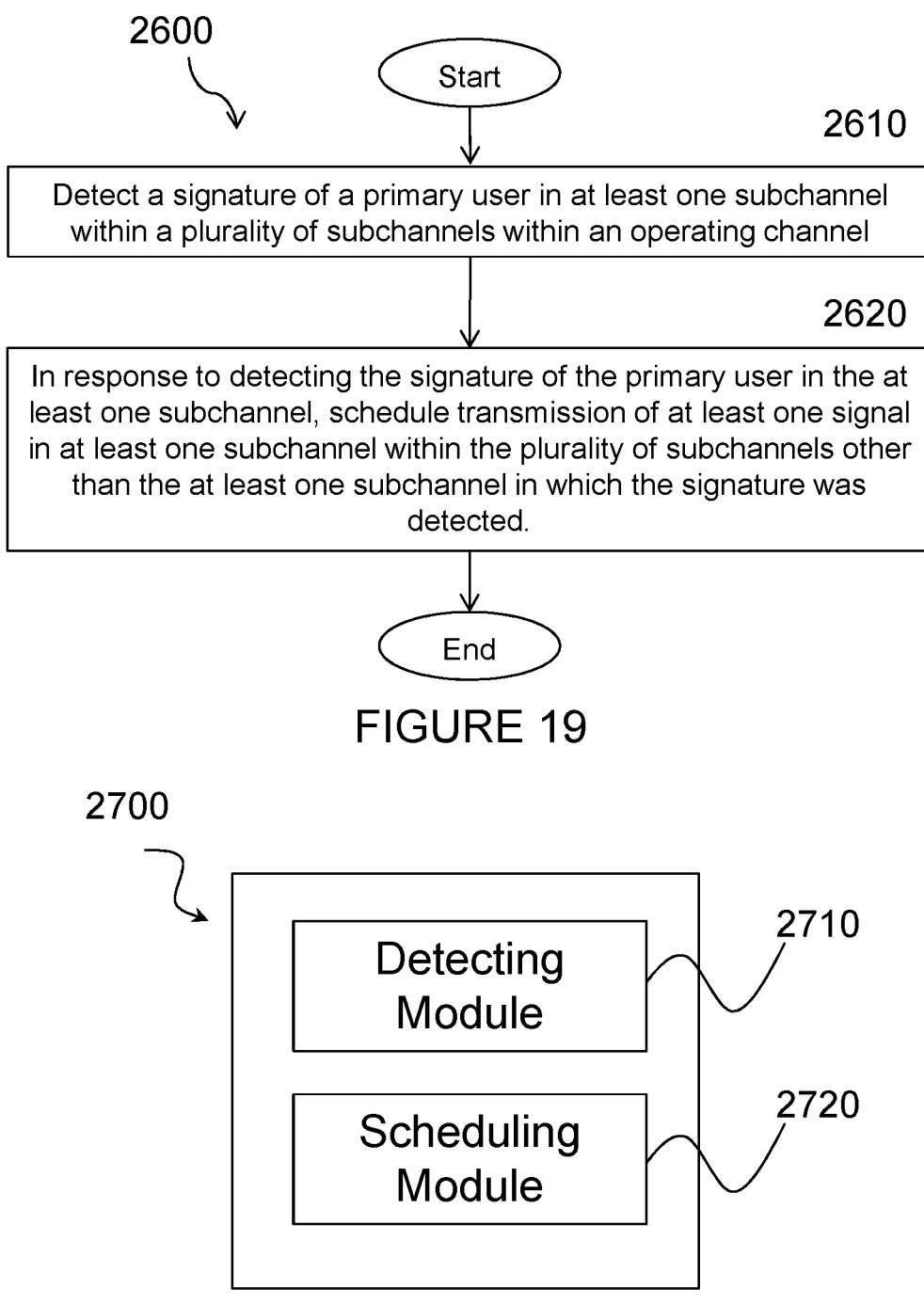

2600

Start

2610

Detect a signature of a primary user in at least one subchannel within a plurality of subchannels within an operating channel

2620

In response to detecting the signature of the primary user in the at least one subchannel, schedule transmission of at least one signal in at least one subchannel within the plurality of subchannels other than the at least one subchannel in which the signature was detected.

End

Detecting Module

2710

Scheduling Module

ADAPTIVE BANDWIDTH USAGE AT RADAR CONGESTION FOR OFDM SYSTEMS

PRIORITY

This nonprovisional application is a U.S. National Stage Filing under 35 U.S.C. § 371 of International Patent Application Serial No. PCT/SE2019/050479 filed May 24, 2019 and entitled "ADAPTIVE BANDWIDTH USAGE AT RADAR CONGESTION FOR OFDM SYSTEMS", which is hereby incorporated by reference in its entirety.

BACKGROUND

As the 2.4 GHz band becomes more crowded, many users are opting to use the 5 GHz band. This not only provides more spectrum, but the 5 GHz band is not as widely used by WiFi and many appliances, including items such as, for example, microwave ovens.

In many countries, regulatory requirements may limit the number of 5 GHz channels available or place additional restrictions on their use because the spectrum is shared with other technologies and services. For example, for parts of band 46, there are regional requirements aiming at protecting radars from interference by other users of the spectrum.

DFS (Dynamic Frequency Selection) is a mechanism that allows a device to identify the radar presence in the channel. Depending on the regional regulatory requirements either we must seize the transmission, or we must stop transmission for an amount of the time in the channel radar is detected. The idea behind this is not to interfere with the radar.

Certain problems with previous systems exist. For example, once the radar is identified on the channel, the channel should be vacated within specified limits. This creates a breakage in the ongoing traffic. The overall throughput of the channel drops drastically. As devices tends to operate towards radar free channels, because of congestion on the channel, throughput may decline. When operating at large system channel bandwidths requiring DFS, a radar hit will take down the entire system channel bandwidth even though radar only is present within a limited part of the channel.

SUMMARY

To address the foregoing problems with existing solutions, disclosed are systems and methods for adaptive bandwidth usage at radar congestion. Specifically, the concept of operating sub-channels is introduced for improved co-existence of evolving 3GPP 4G/5G and IEEE 802.11 signals with frequency bands where active primary radar sources exist. The improvement achieves the key requirements of spectrum sharing with co-existing radar transceivers, while optimally maximizing network capacity through effective usage of spectrum, and not disturbing the ongoing traffic.

According to certain embodiments, a method by a network node includes detecting a radar signal in at least one subchannel within a plurality of subchannels within an operating channel. In response to detecting the radar signal in the at least one subchannel, transmission of at least one signal is scheduled in at least one subchannel within the plurality of subchannels other than the at least one subchannel in which the radar signal was detected.

According to certain embodiments, a network node includes processing circuitry configured to detect a radar signal in at least one subchannel within a plurality of subchannels within an operating channel. In response to detecting the radar signal in the at least one subchannel, the processing circuitry schedules transmission of at least one signal in at least one subchannel within the plurality of subchannels other than the at least one subchannel in which the radar signal was detected.

According to certain embodiments, a method performed by a network node includes detecting a signature of a primary user in at least one subchannel within a plurality of subchannels within an operating channel. In response to detecting the signature of the primary user in the at least one subchannel, transmission of at least one signal is scheduled in at least one subchannel within the plurality of subchannels other than the at least one subchannel in which the signature of the primary user was detected.

Certain embodiments of the present disclosure may provide one or more technical advantages. For example, a technical advantage may be that certain embodiments may provide effective utilization of the unlicensed band, which is a critical task in modern communications. As another example, a technical advantage may be that certain embodiments optimize the bandwidth usage with Dynamic Frequency Selection.

As another example, a technical advantage may be that certain embodiments provide a mechanism to selectively shutdown the operating subchannels interfering with nearby radar transceivers, while non-interfering operating subchannels remain in operation.

As still another example, a technical advantage may be that, depending on the regulatory requirements and the particular techniques uses, certain embodiments operate without any breakage in the connection. As such, certain embodiments eliminate outages due to the loss of a complete operating channel, while maximizing the achievable throughput on the remaining available operating sub-channels.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 19 illustrates another example method by a network node for adaptive bandwidth usage at radar congestion, according to certain embodiments; and FIG. 20 illustrates another example virtual computing device for adaptive bandwidth usage at radar congestion, according to certain embodiments.

DETAILED DESCRIPTION

Figure 1:
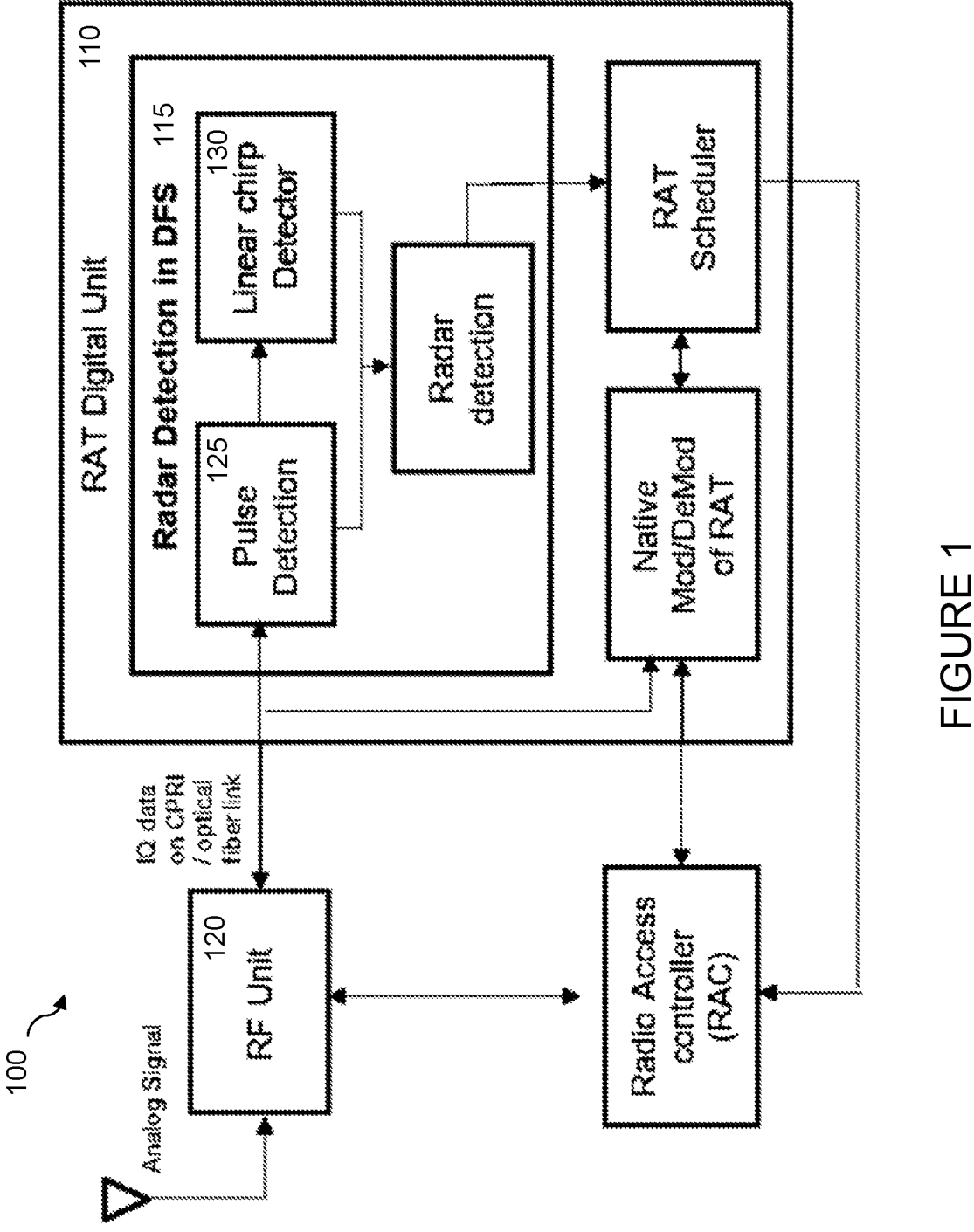
FIG. 1 illustrates an example context 100 for a dynamic frequency selection (DFS) algorithm in a Radio Access Technology (RAT) digital unit 110, according to certain embodiments.

Particular embodiments of the present disclosure may provide solutions providing adaptive bandwidth usage at radar congestion in Orthogonal Frequency Division Multiple Access (OFDMA) based systems.

In the world of modern communications, the effective utilization of the unlicensed band is a critical task. The FCC regulations define 'operating channels' as having 20 MHz operating bandwidth selected to align to IEEE 802.11 channel bandwidths. The FCC defined these channels in the rules "905462 D06 802 11 Channel Plans New Rules v02" to address co-existence issues with the TDWR band from 5600-5650 MHz, which spans full and partial 20 MHz Wi-Fi channel boundaries. Additionally, non-TDWR radar signals such as the SpaceX Falcon Radar Transponder (as disclosed in Falcon User's Guide by SpaceX) exist both in DFS (5690 MHz) and non-DFS (5765 MHz) frequency bands which cross 20 MHz channel bandwidths, or employ operating bandwidths less a 20 MHz 3GPP 4G or 5G channel.

According to certain embodiments, two methods or use cases are disclosed herein for optimizing the bandwidth usage with DFS by performing operating subchannel shutdown after radar detection on DFS required channel.

The first method or use cases employs native 3GPP OFDM based technologies, for example 4G LTE and 5G NR, where OFDM carriers are grouped into resource blocks (RBs), and RB are grouped into a number of operating subchannels. This is similar, but not identical to the definition of CAT-M1 channels which appear as subchannel. As disclosed heroin, an operating subchannel utilizes a portion of an operating channel. The operating channel may be 20 MHz, as depicted in FCC regulations, or larger and/or smaller than 20 MHz, as describes in 3GPP 4G and 5G standards as well as current IEEE 802.11 standards.

By dividing each operating channel into a number of operating subchannels, where each operating subchannel is independently controlled, the 3GPP radio system introduces a finer granularity of control, and is able to only shut down the operating subchannel that is found to be interfering with radar, while continuing operation on the non-interfering operating subchannels. For example, according to certain embodiments, a radio scheduler may aggregate contiguous subchannels consisting of a defined number of physical resource blocks (in LTE) or resource units (in 802.11) up to the system channel bandwidth. Since there are no guard bands between the PRBs/RUs constituting an operating subchannel in an OFDM system, there will be no gaps between contiguous operating sub-channels where the detection performance could be degraded.

The second method/use case enables the radio access technology to re-initialize and reconfigure the operating channel by removing operating subchannels where radar has been repeatedly detected from the candidate set of operating subchannels. As consequence, the maximum operating channel bandwidth may be reduced by the removed set of repeated offending operating sub-channels. This tradeoff mitigates the risk for hard shutdown of the complete operating channel, and yields a steady state operating condition which optimally utilizes the operating channel bandwidth, while meeting the intent of the DFS function, which guarantees spectrum sharing with active radar transceivers by forcing secondary users to not transmit on frequencies used by radar transceivers.

This second use case is IEEE 802.11ax, which describes Partial Bandwidth support for UL and DL MU-MIMO operation, but fails to align this concept with DFS operation and misses the concept of operating subchannels:

IEEE P802.11ax/D3.2, October 2018, Table 9-322b states "Partial Bandwidth UL MU-MIMO) for an AP and [non-AP STA] indicates support for receiving an RU . . . the RU size is greater than or equal to 106-tones, and the RU does not span the entire PPDU bandwidth (UL MU-MIMO within OFDMA).

28.3 HE PHY in 28.3.1.1 MU transmission describes that MU transmissions include both DL MU transmissions and UL MU transmissions. The HE PHY defines DL MU-MIMO and UL MU-MIMO, for both the full bandwidth case as well as for the partial bandwidth case where MU-MIMO is used only on certain RUs in the PPDU. The combination of SU transmissions and MU-MIMO transmissions on different RUs in one PPDU is also supported. Partial Bandwidth UL and DL operation uses a grouping feature for UL MU-MIMO. "Grouping Indicates the subcarrier grouping, Ng, used for the compressed beamforming feedback matrix: Set to 0 for Ng=4 Set to 1 for Ng=16" [Table 9-94a].

According to certain embodiments, the time domain samples received over the system channel bandwidth are analyzed by the DFS algorithm in time and frequency domain. At a radar hit in DFS, the concerned operating subchannel(s) where the radar application is transmitting is identified by estimating the center frequency and bandwidth of the radar signal. When the DFS algorithm detects radar, the operating subchannel is immediately shutdown. The ongoing user data or control data on the operating subchannel may be lost until next RAT scheduling occasion on different operating subchannels, but the data could be decodable for the UE even though some parts of it is missing. The performance impact will depend on the code rate the user(s) operate at and the aggregation level. The radar interfering operating subchannels are notified to the RAT Scheduler by the DFS. The RAT Scheduler should not allocate any user or control data on these operating subchannels.

Note that shutdown of operating subchannels might contain sync and reference signals. In such a scenario, and according to particular embodiments, the information may be communicated to the user equipment or other slave device. This information may be used by the user equipment and or other slave device for the sync update and the channel estimation.

Thus, according to this method, reconfiguration of system bandwidth is enabled. In this approach, RAT will seize all ongoing transmissions and RAT system is reconfigured with the reduced system bandwidth. The new bandwidth of the RAT will not interfere the radar signal any more. This method uses bandwidth scalability of the native OFDM bases systems. The time taken to or reconfiguration of system channel bandwidth should be within limits of the local regulatory authorities.

Particular embodiments are described in FIGS. 1-20 of the drawings, like numerals being used for like and corresponding parts of the various drawings. FIG. 1 illustrates an example context 100 for a dynamic frequency selection (DFS) algorithm in a Radio Access Technology (RAT) digital unit 110, according to certain embodiments. In a particular embodiment, the RAT digital unit 110 is a RAT transceiver.

The Radar detector 115 performs an integral part of the DFS algorithm that is to be implemented in the RAT transceiver together with the native RAT channel estimation, modulator/demodulator and encoding/decoding modules. The radar detector operates on the digitalized complex radio frequency (RF) samples received over Common Public Radio Interface (CPRI) or an optical fiber link from the RF unit 120. According to certain embodiments described herein, a detector is provided that detects whether an intercepted linear chirp is present in the RF samples. The detector 125 is preceded by a Pulse Detection block 130 that detects that energy has been detected for a short time duration. The short time duration of energy followed by a silent period that then repeat itself characterizes a potential intercepting radar signal in the RF samples.

Radar detection is a mandatory procedure to operate in the DFS bands. If radar is not detected, then the DFS channel may be acquired and channel may be used for data transmissions. During the service, the channel should be monitored continuously depending on the regulatory requirements. Once the radar is identified on the operating channel, in the "in-service" state, the RAT must cease transmissions following a Channel Move Time, where transmissions are limited to the Channel Closing Transmission Time procedure, as defined by the FCC in 905462 D02 UNII DFS Compliance Procedures New Rules v02. According to certain embodiments described herein, the DFS channel is divided into contiguous operating subchannels, each of which performs independent DFS processing state machines.

According to certain embodiments, a bandwidth and approximate center frequency estimation module is introduced after detection of radar. This module calculates the 90 to 99% bandwidth of the 100% transmission of the radar, as defined in FCC DFS regulations. This module also provides the approximate center frequency of the transmission of radar. There several cognitive signal processing methods to detection bandwidth of the intercepted signal. The present invention will not discuss anything on the methods used for the estimation bandwidth and center frequency. The present invention uses the results of the bandwidth and center frequency results. The bandwidth and center frequency are used to define operating subchannels that are interfering with radar. With this information, only those operating subchannels which interfere with the detected radar signatures are "Closed" leaving remaining operating subchannels (a partial part of the total system bandwidth) for transmissions.

The embodiments described herein can be used any OFDM based systems.

LTE-LAA and IEEE 802.11ax have higher possibility deployment. The ideas of the present disclosure are explained with respect to LTE-LAA and IEEE 802.11ax. RAT (LTE-LAA/IEEE 802.11ax) cell of 20 MHz started data transmission on a DFS channel after performing initial channel availability check (CAC). The subchannels where DFS detect radar will then be blocked for usage by the RAT scheduler already from the start. Once the transmission has started the subchannels in the LTE-LAA cell will operate in an in-service monitoring state for radar, as per the regulations shall be performed.

The particular embodiments of the two solutions will now be described in more detail.

According to certain embodiments providing selective subchannel shutdown, the DFS output may be continuously fed as input to the RAT scheduler and lower layers. With this information, the RAT scheduler will not allocate any data on the subchannels occupied by the radar and potential cell reference signals belonging to affected subchannel(s) are effectively removed at lower layers.

Figure 2:
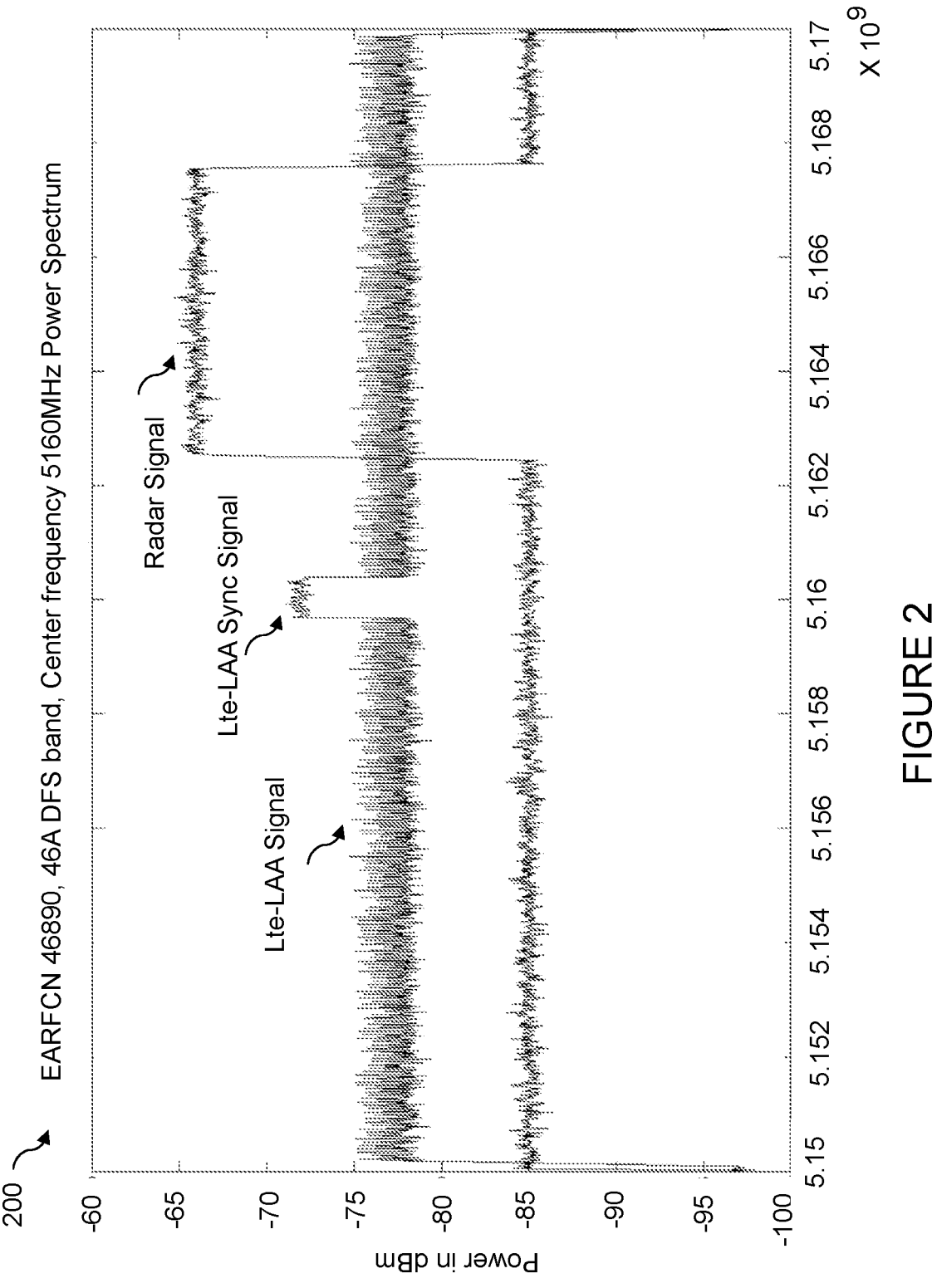
FIG. 2 illustrates the radar being received on the subchannel of the LTE-LAA, according to certain embodiments.
Figure 3:
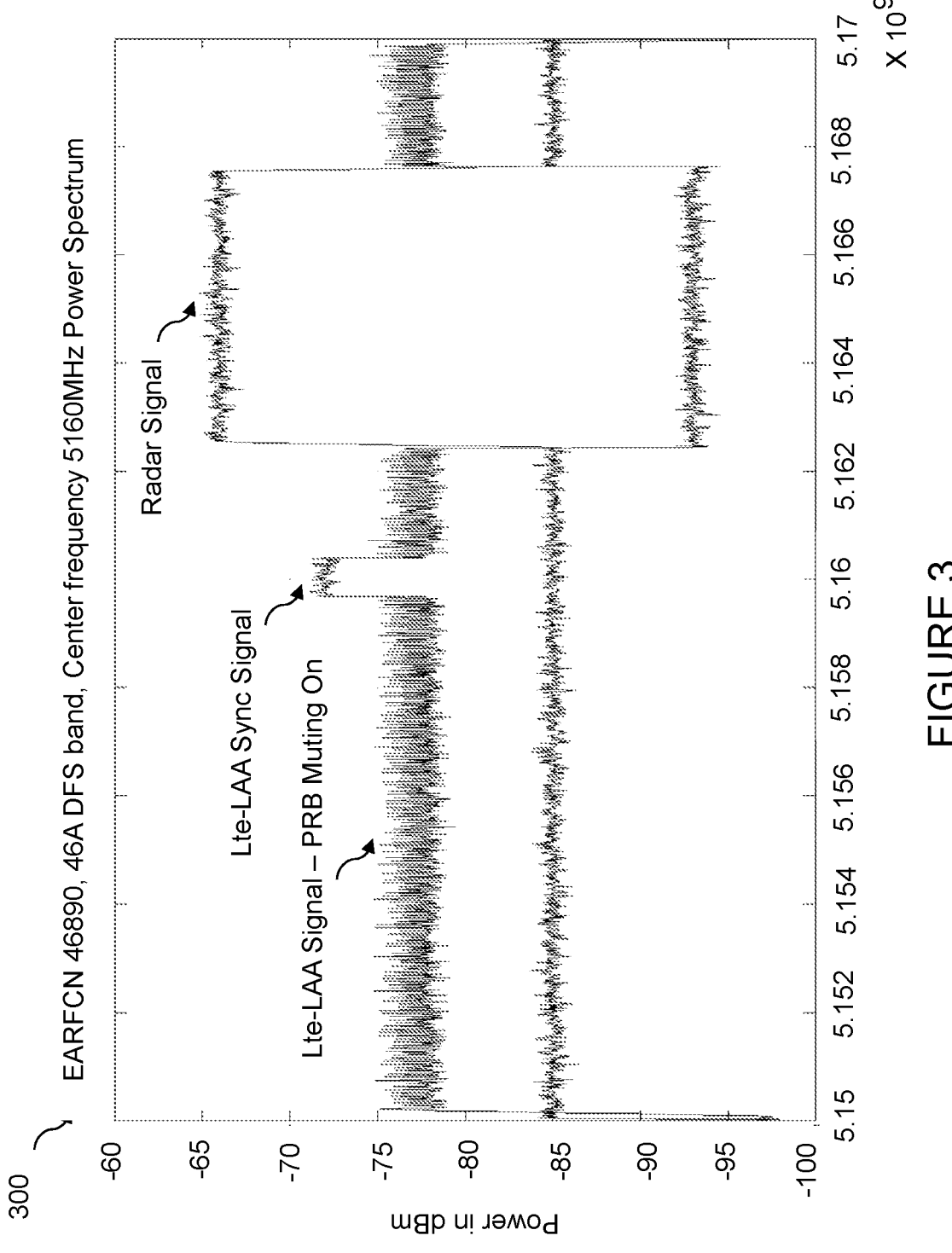
FIG. 3 illustrates the interfering portion of the LTE-LAA signal with radar being removed using a subchannel shutdown technique, according to certain embodiments.

FIG. 2 illustrates the radar being received on the subchannel of the LTE-LAA. Specifically, FIG. 2 illustrates a 20 MHz LTE-LAA signal at EARFCN 46890 where the detected radar is not interfering with sync signals or system information. By contrast, FIG. 3 illustrates the interfering portion of the LTE-LAA signal with radar being removed using a subchannel shutdown technique. More specifically, FIG. 3 illustrates a 20 MHz LTE-LAA signal at EARFCN 46890 where subchannel shutdown is ON.

Subchannel shutdown is technique which enables LTE-LAA system, not to transmit anything on the PRBs belonging to the subchannel. The scheduler can easily omit scheduling of traffic in the radar effected subchannels and by this achieve a shutdown. If the radar signal is detected on the same subchannel as cell reference signals the shutdown of these signals must be done at the lower layers close to the OFDM modulator.

If only data traffic is affected the master device (eNodeB, LTE Pcell) need not to communicate the changes to the slave device (UE). This change in the transmission barely effect the decoding capability of the slave device. If the information is communicated through the Pcell it improves the decoding performance on the UE.

Subchannel shutdown will not work if the radar occupies the sync signal and broadcast channel subchannels of LTE-LAA. To overcome this situation, a bandwidth scalability feature of the LTE-LAA system can be used where the new configuration of the SCell is communicated over PCell, as described in more detail below.

802.11 ax has adopted the LTE technology to serve more users by assigning parts of frequency band called subchannels. Each 802.11 (20, 40, 80 and 160 MHz) channel, which may include but are not limited to 20, 40, 80 and 160 MHz, in one example, are small subchannels. The minimum sub channel size is of 26 sub carriers and is called as Resource Unit. 802.11ax has defined various size of Resource Units. The minimum size of each resource unit is 2031.25 KHz.

By finding the radar effected subchannels within the system bandwidth, scheduler can shut down the respective subchannels (Resource Units) interfering with radar alone. In case of 802.11 the shutdown of the transmission will be done in multiples of resource units. If the scheduler uses the small size Resource Unit, the bandwidth can be used effectively in case of radar hit due to that a higher granularity in shutdown is achieved.

Figure 4:
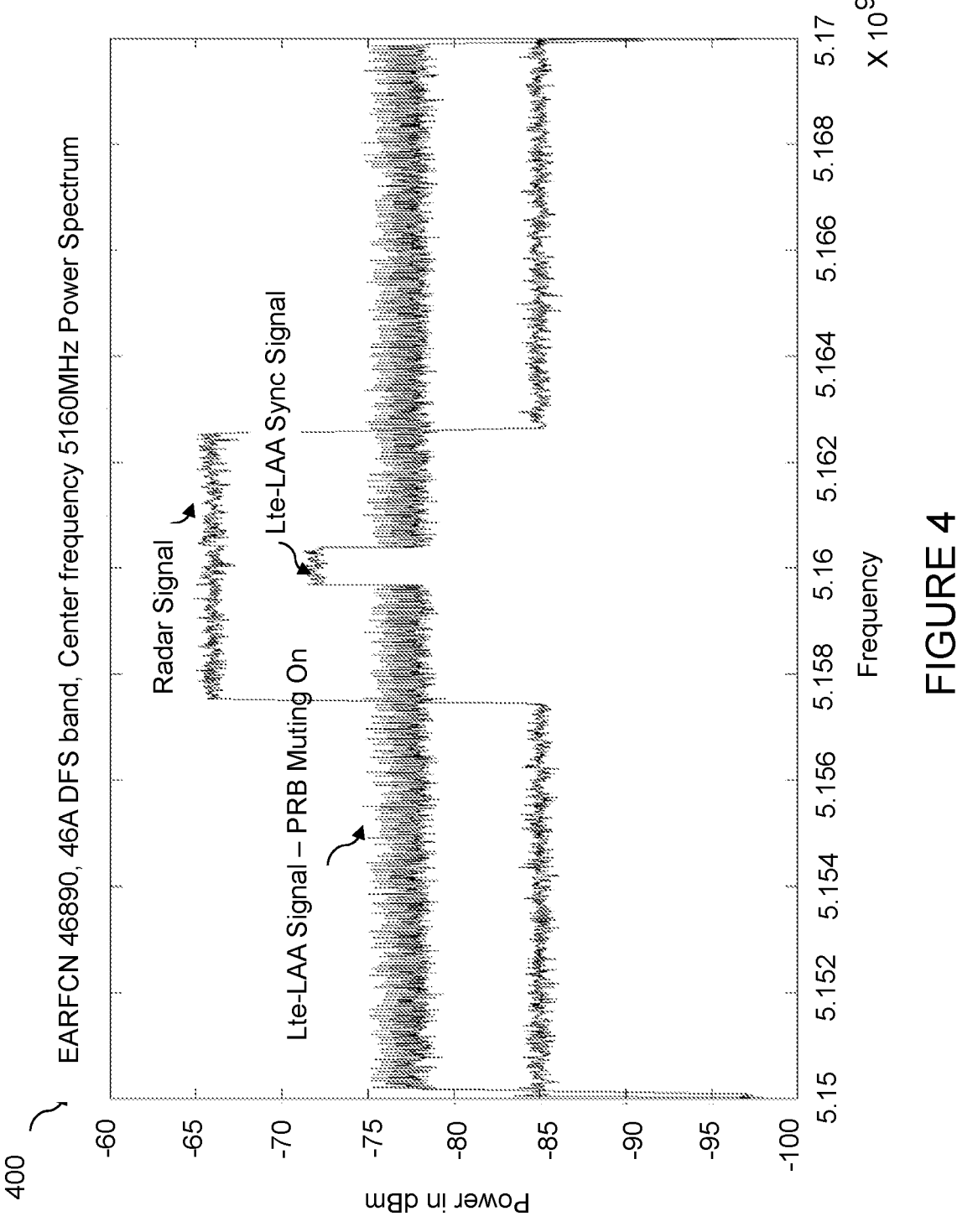
FIG. 4 illustrates that a radar signal occupies the sync and system information parts of LTE-LAA, according to certain embodiments.

According to certain embodiments, a method may include reconfiguring the LTE-LAA Scell with reduced bandwidth. For example, FIG. 4 illustrates that a radar signal occupies the sync and system information parts of LTE-LAA, according to certain embodiments. Thus, the LTE-LAA sync signal interferes with the radar signal. The LTE-LAA cell should then stop the transmission in the whole system channel bandwidth. In this case, by using the bandwidth scalability feature, so that the LTE-LAA signal will not interfere with radar. Depending on the radar occupied subchannels, LTE-LAA cells can be configured with reduced bandwidth where the concerned subchannels where DFS found radar are omitted permanently. An option here is to shutdown all subchannels within the system channel bandwidth according to the time limits in the regulations and then performing CAC for the same subchannels once the channels are available for CAC again. But if the radar repeatedly is found in the same subchannel(s) as sync and system information it might be better to use bandwidth scalability. As depicted in FIG. 4, the radar signal is occupied approximately 5.5 MHz around EARFCN 46890 out of 20 MHz of LTE-LAA bandwidth. There is around 7 MHz bandwidth is available on the both sides of EARFCN 46890 within 20 MHz.

Figure 5:
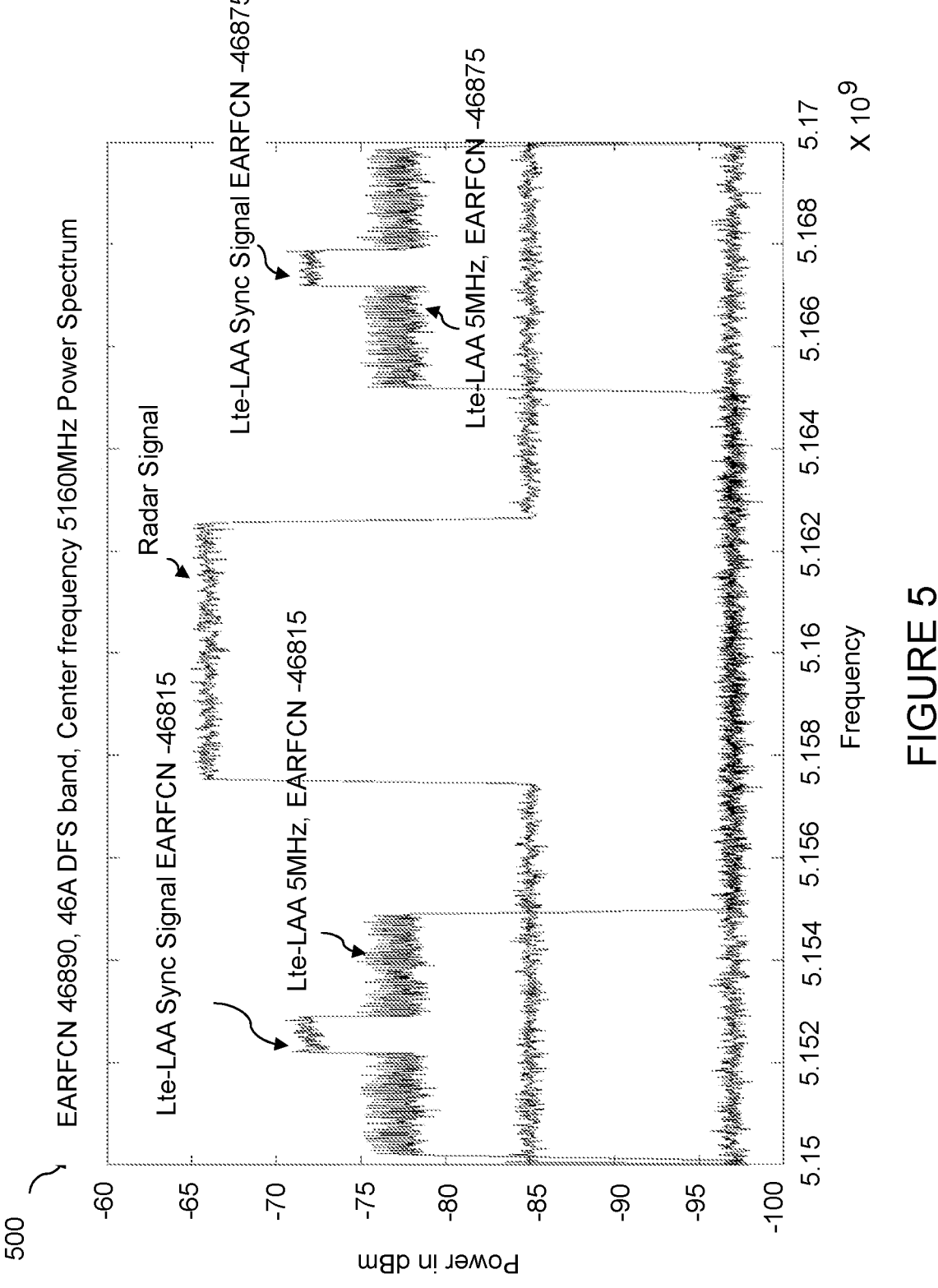
FIG. 5 illustrates a reduced bandwidth LTE-LAA signal transmission without interfering radar, according to certain embodiments.

FIG. 5 illustrates a reduced bandwidth LTE-LAA signal transmission without interfering radar. For example, using information, two LTE-LAA cells with 5 MHz bandwidth at EARFCN numbers and 86815, 46875 can be configured as shown in FIG. 5. These new LTE-LAA cells do not interfere with the radar anymore.

Figure 6:
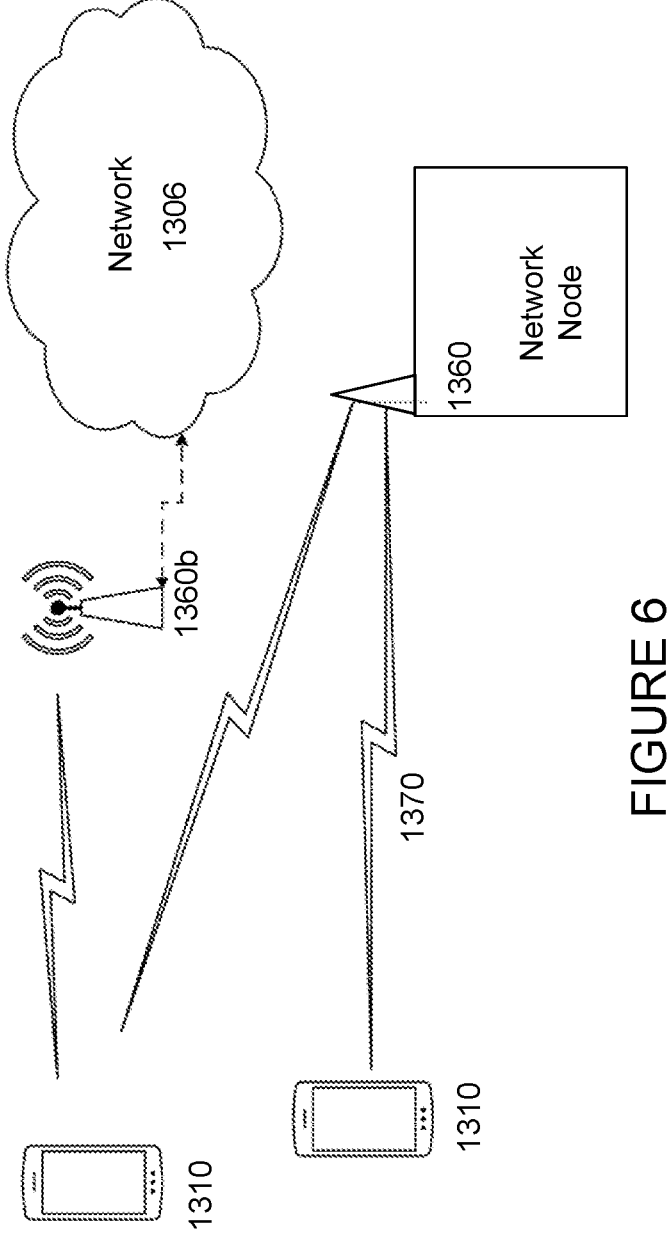
FIG. 6 illustrates an exemplary network for adaptive bandwidth usage at radar congestion, according to certain embodiments.

FIG. 6 is a block diagram a wireless network 1300 for linear chirp detection, in accordance with certain embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
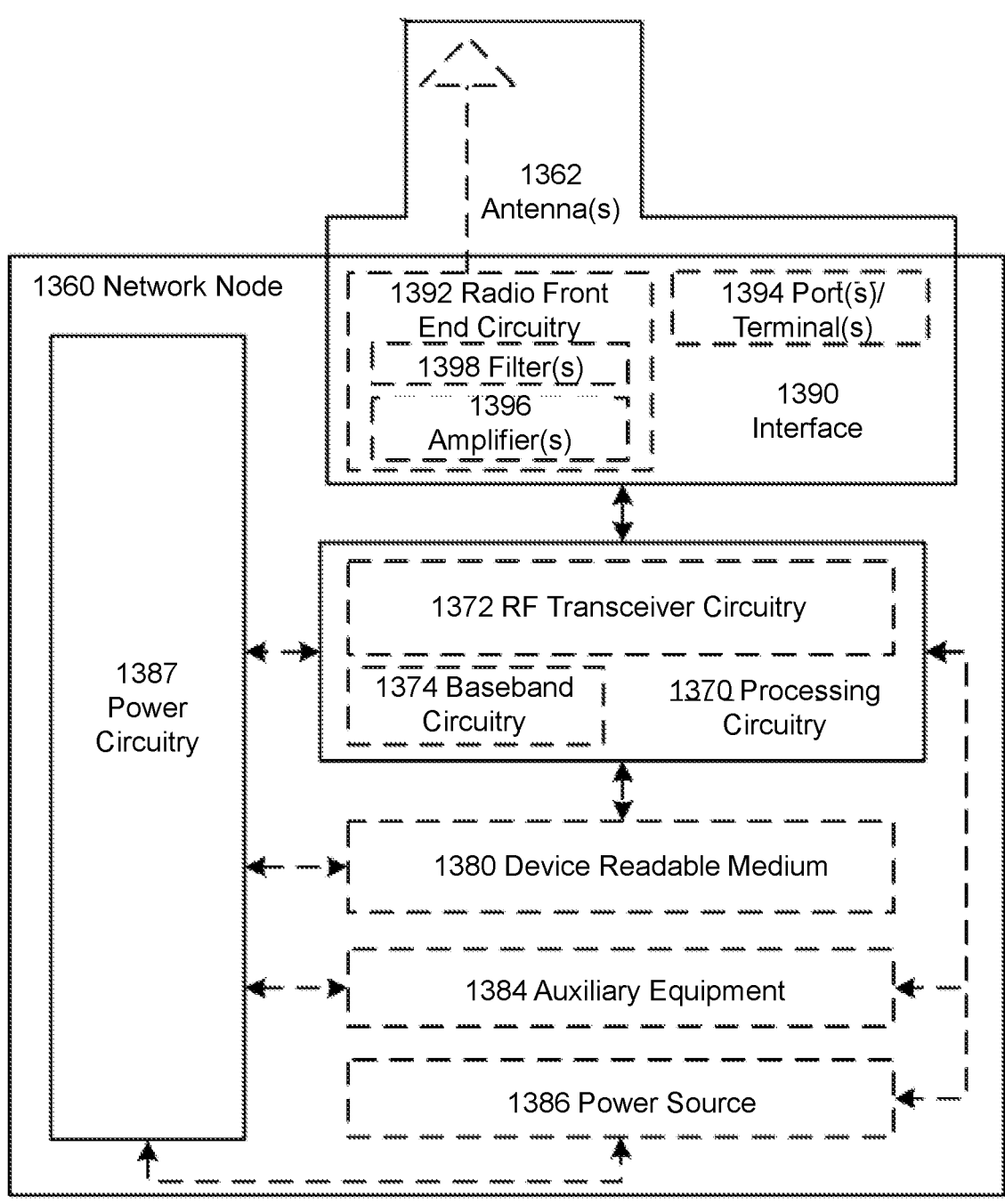
FIG. 7 illustrate an example network node for adaptive bandwidth usage at radar congestion, according to certain embodiments.

FIG. 7 illustrates an example network node 1360 for linear chirp detection, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units.

In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node

1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 6 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

Figure 8:
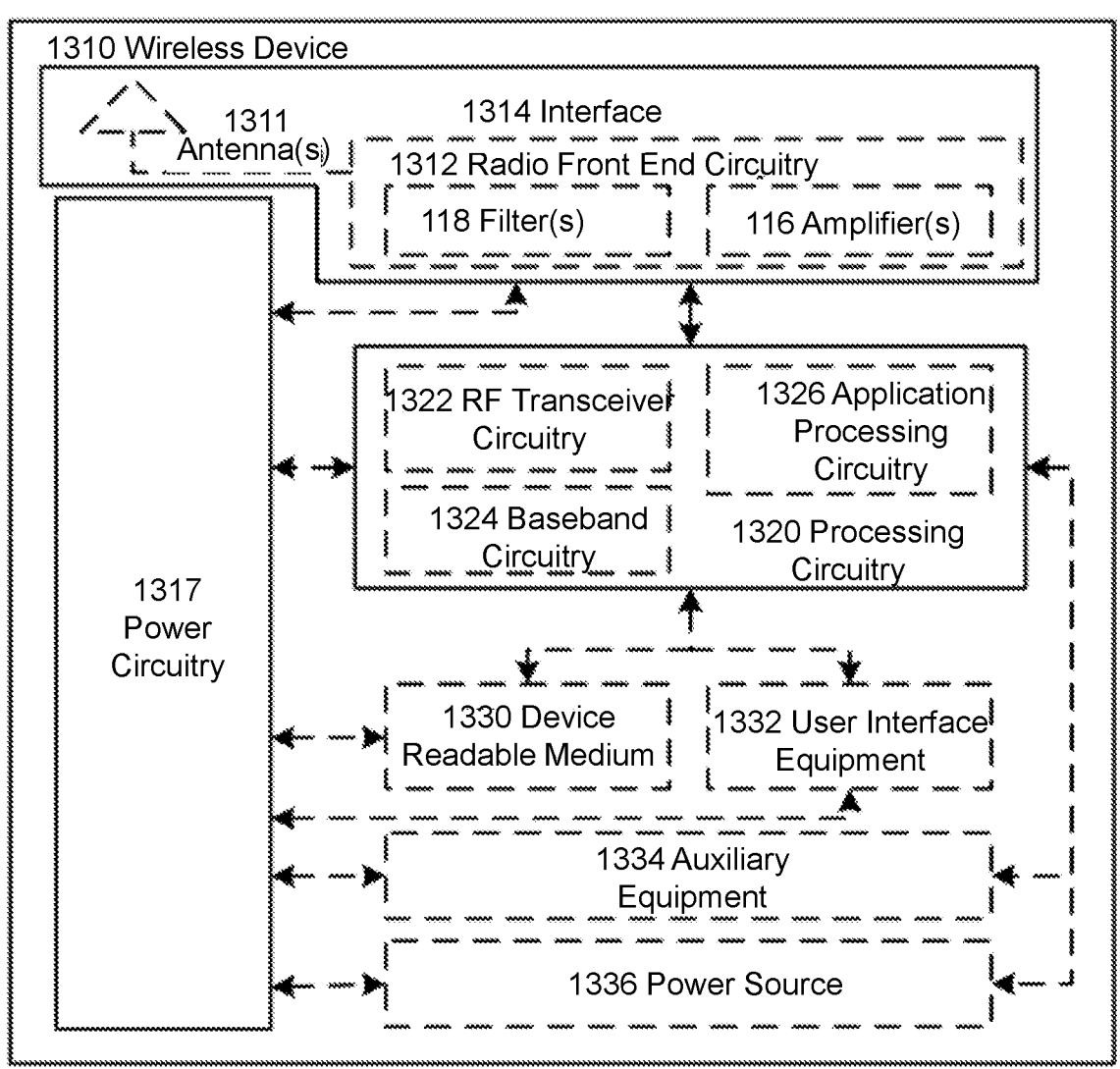
FIG. 8 illustrates an example wireless device for adaptive bandwidth usage at radar congestion, according to certain embodiments.

FIG. 8 illustrates an example wireless device (WD) for linear chirp detection, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310 and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 9:
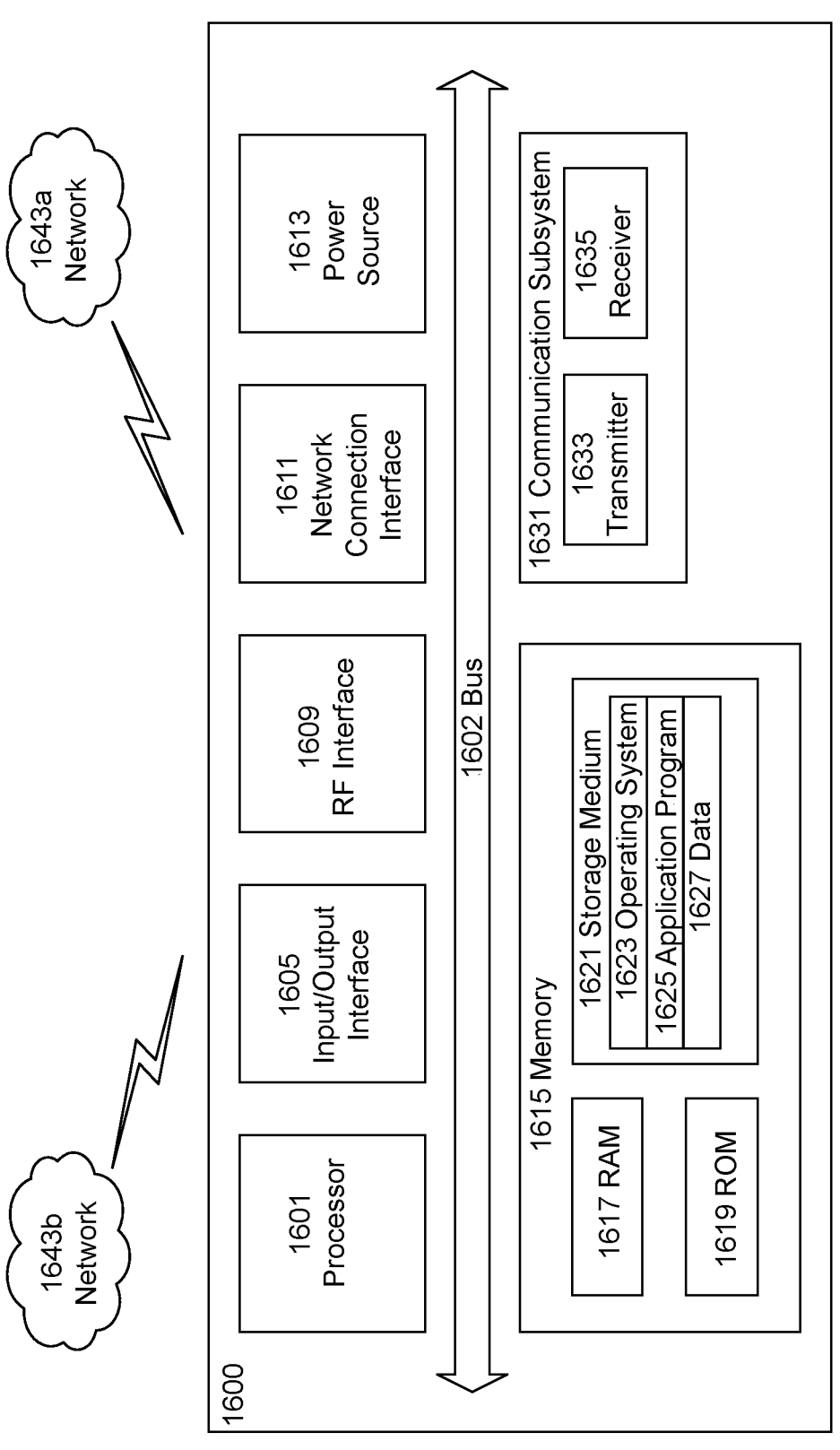
FIG. 9 illustrates an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the 3rd Generation Partnership Project (3GPP), including a NB-IoT UE, a machine type communication (MTC) UE, and/or an enhanced MTC (eMTC) UE. UE 1600, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1405. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643a may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 9, processing circuitry 1601 may be configured to communicate with network 1643b using communication subsystem 1631. Network 1643a and network 1643b may be the same network or networks or different network or networks. Communication subsystem 1631 may be configured to include one or more transceivers used to communicate with network 1643b. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643b may encompass wired and/or wireless networks such as a local-area network (LAN), a wide-area network (WAN), a computer network, a wireless network, a telecommunications network, another like network or any combination thereof. For example, network 1643b may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 10:
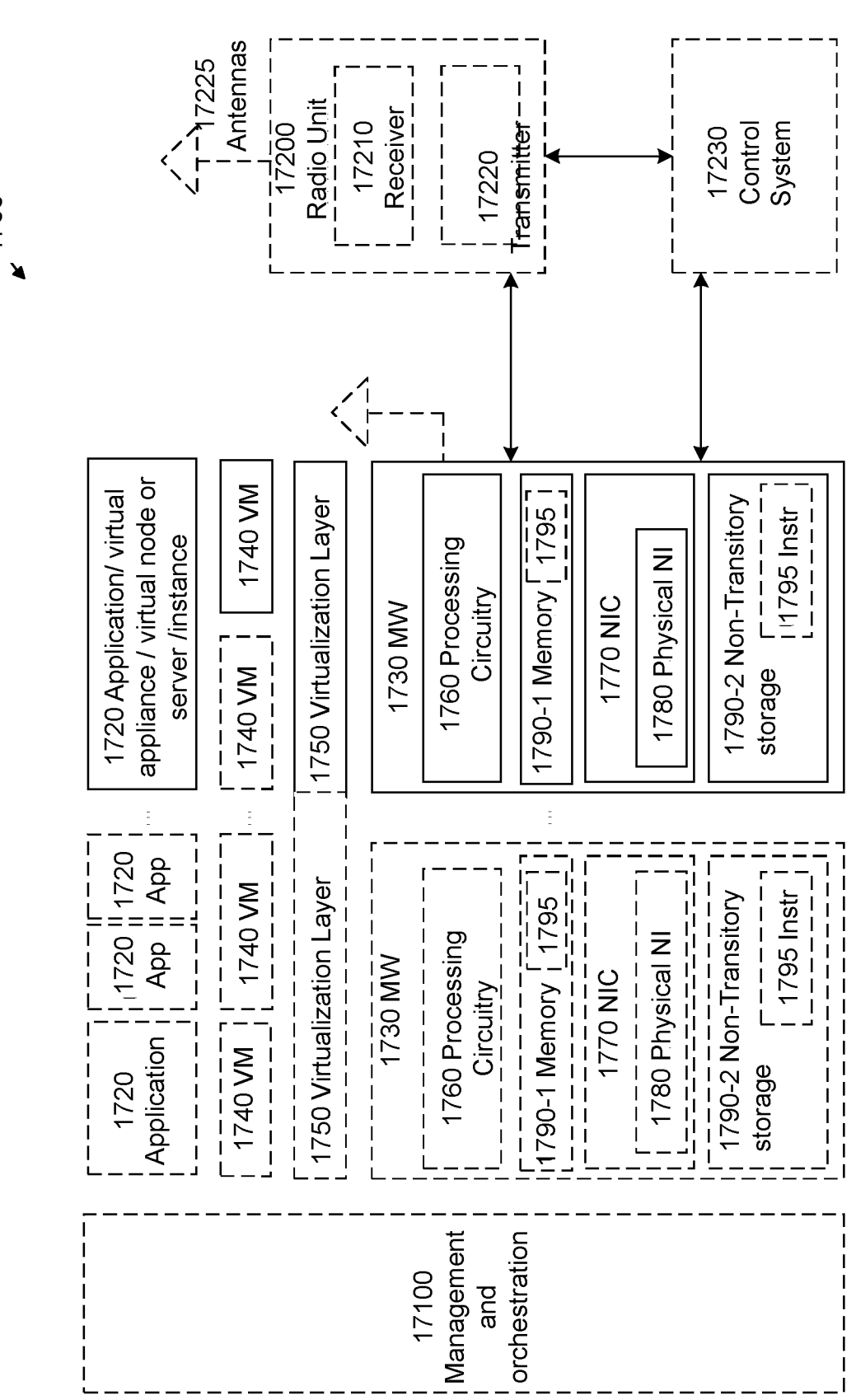
FIG. 10 illustrates an example virtualization environment, according to certain embodiments.

FIG. 10 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 10, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 10.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signaling can be affected with the use of control system 17230 which may alternatively be used for communication between the hardware nodes 1730 and radio units 17200.

Figure 11:
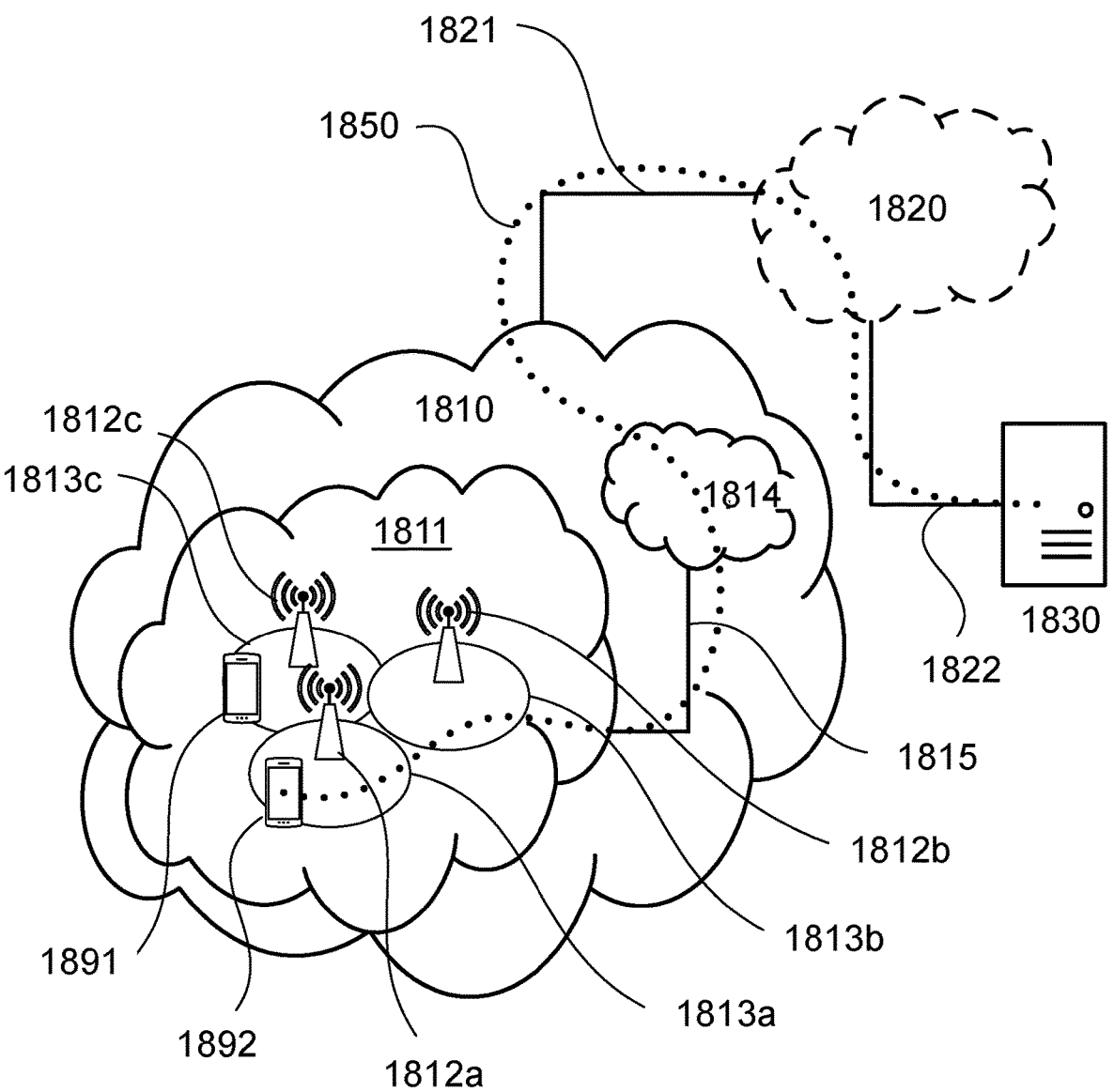
FIG. 11 illustrates a telecommunication network connected via an intermediate network to a host computer, according to certain embodiments.

FIG. 11 illustrates a telecommunication network connected via an intermediate network to a host computer in accordance with some embodiments. With reference to FIG. 11, in accordance with an embodiment, a communication system includes telecommunication network 1810, such as a 3GPP-type cellular network, which comprises access network 1811, such as a radio access network, and core network 1814. Access network 1811 comprises a plurality of base stations 1812a, 1812b, 1812c, such as NBs, eNBs, gNBs or other types of wireless access points, each defining a corresponding coverage area 1813a, 1813b, 1813c. Each base station 1812a, 1812b, 1812c is connectable to core network 1814 over a wired or wireless connection 1815. A first UE 1891 located in coverage area 1813c is configured to wirelessly connect to, or be paged by, the corresponding base station 1812c. A second UE 1892 in coverage area 1813a is wirelessly connectable to the corresponding base station 1812a. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 11 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 12:
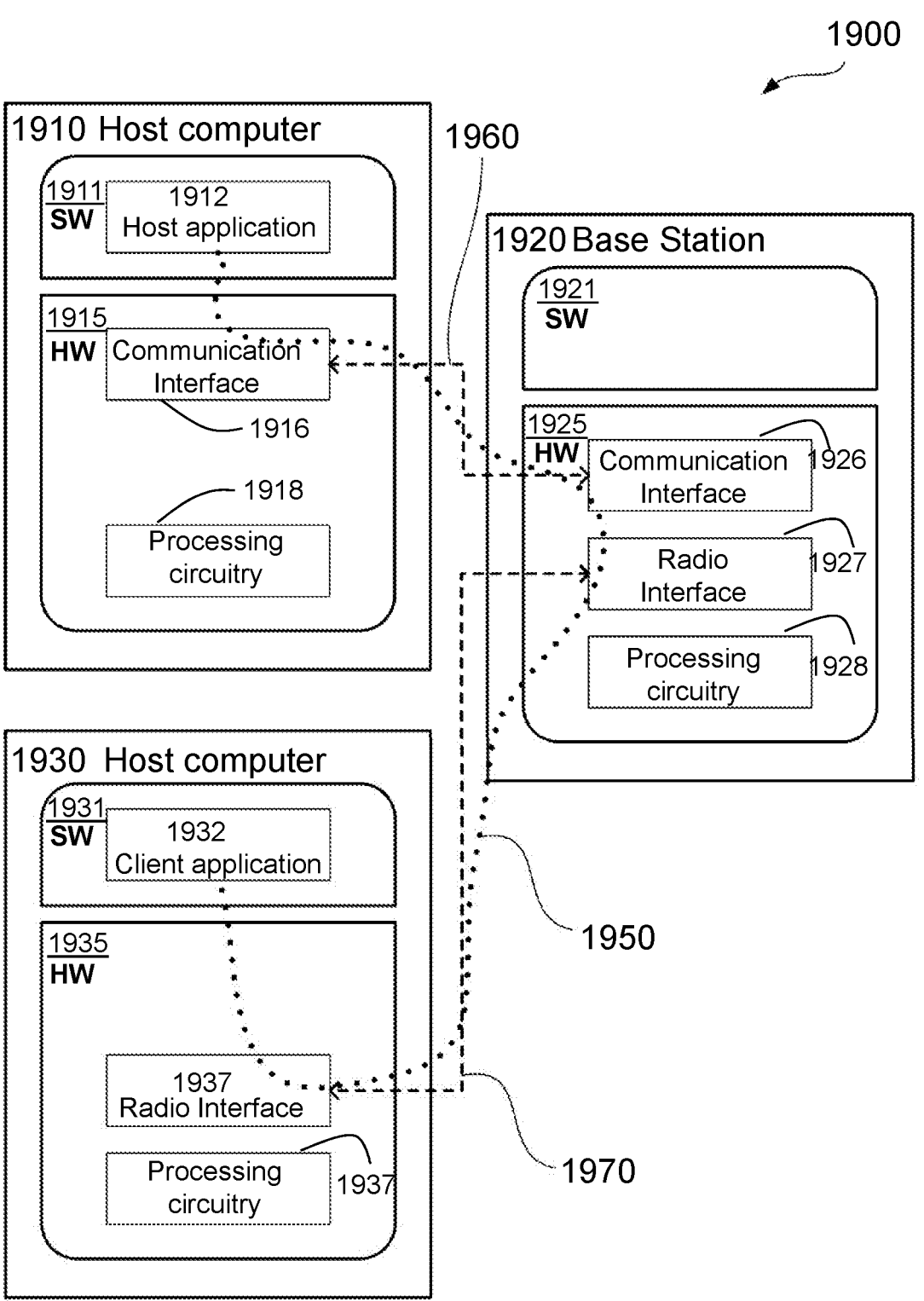
FIG. 12 illustrates a generalized block diagram of a host computer communicating via a base station with a user equipment over a partially wireless connection, according to certain embodiments.

FIG. 12 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 12. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 12) served by base station 1920. Communication interface 1926 may be configured to facilitate connection 1960 to host computer 1910. Connection 1960 may be direct or it may pass through a core network (not shown in FIG. 12) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 12 may be similar or identical to host computer 1830, one of base stations 1812a, 1812b, 1812c and one of UEs 1891, 1892 of FIG. 11, respectively. This is to say, the inner workings of these entities may be as shown in FIG. 12 and independently, the surrounding network topology may be that of FIG. 11.

In FIG. 12, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figures 13, 14:
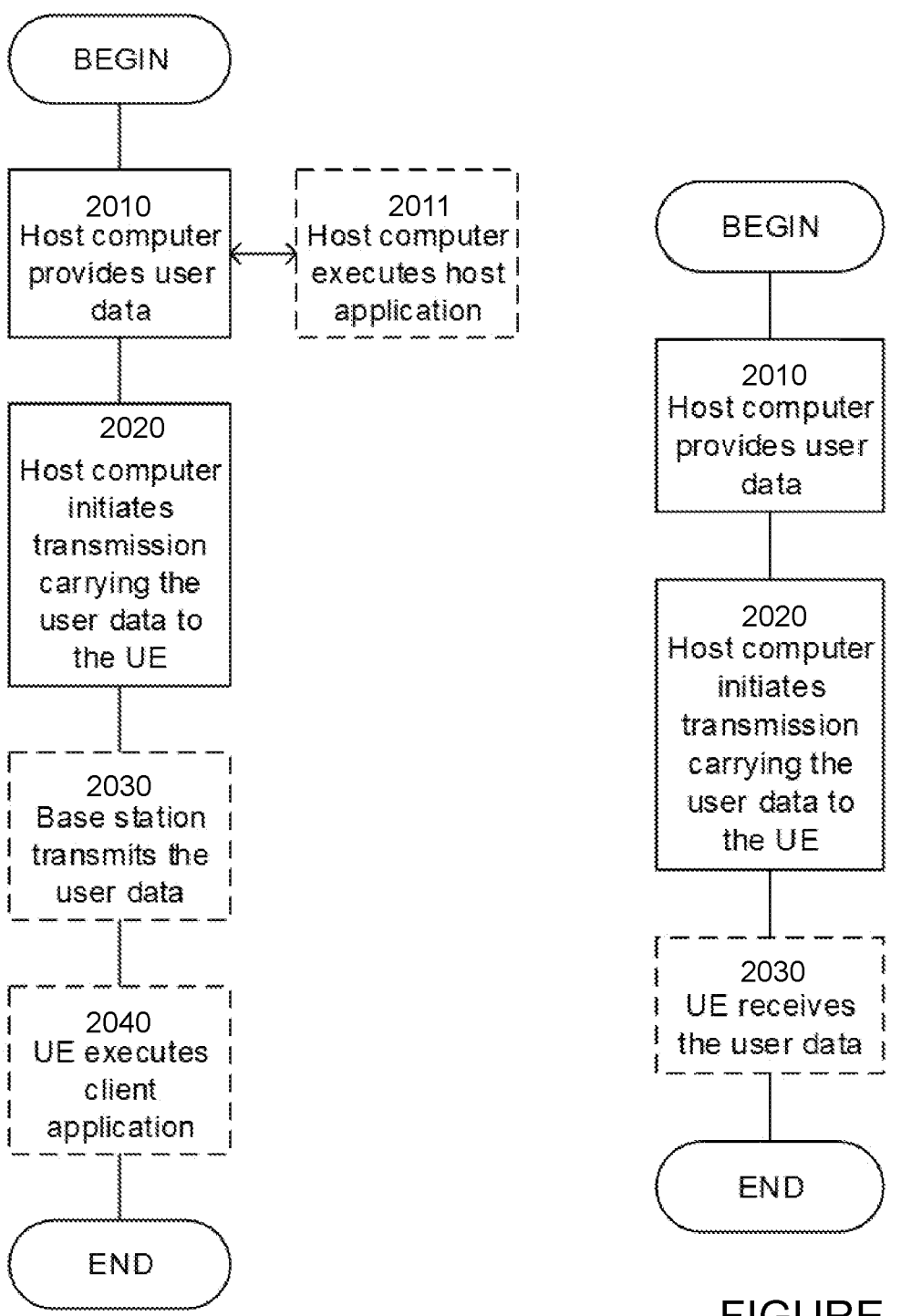
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figures 15, 16:
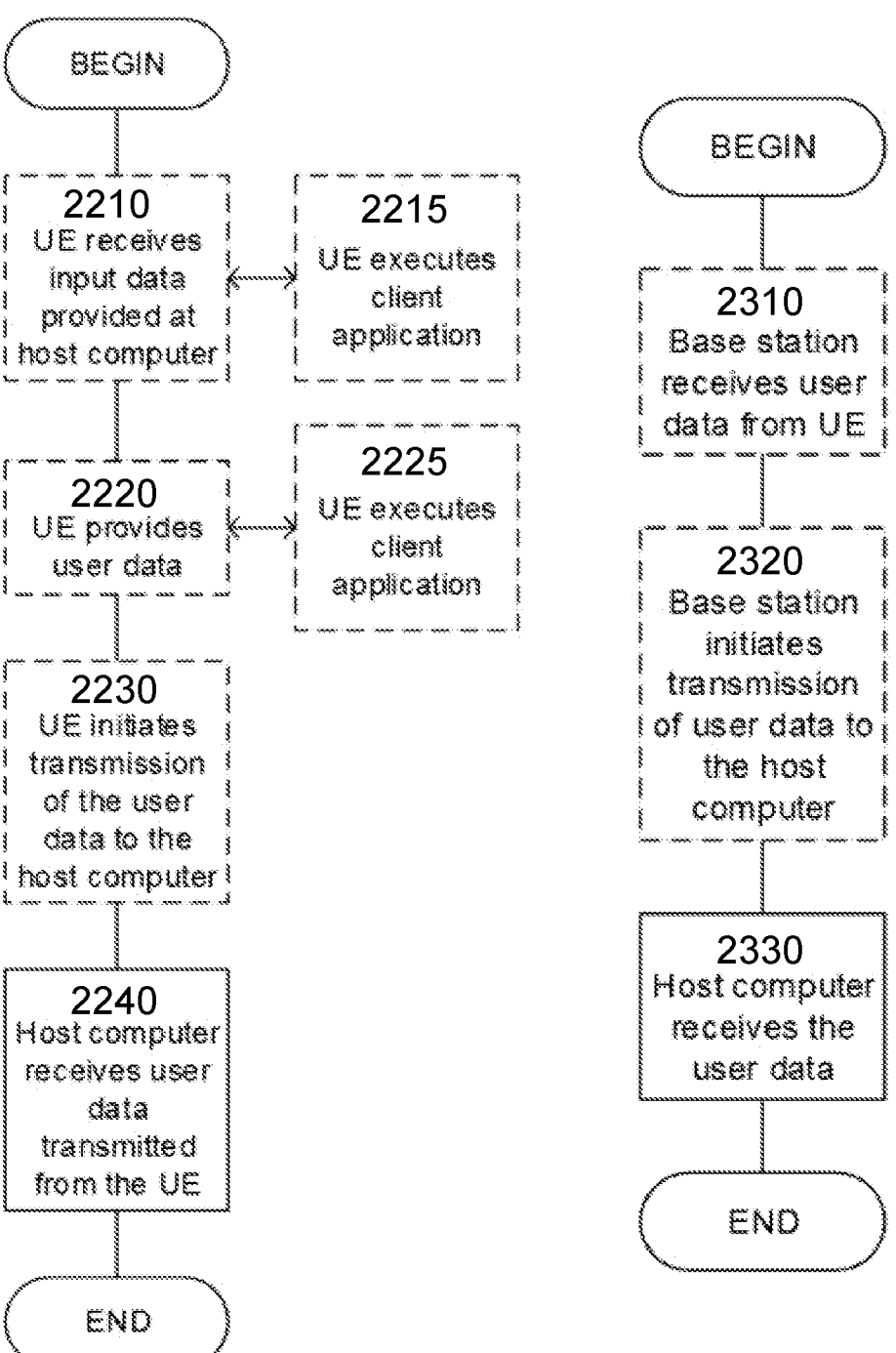
FIG. 15 illustrates another method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Figure 17:
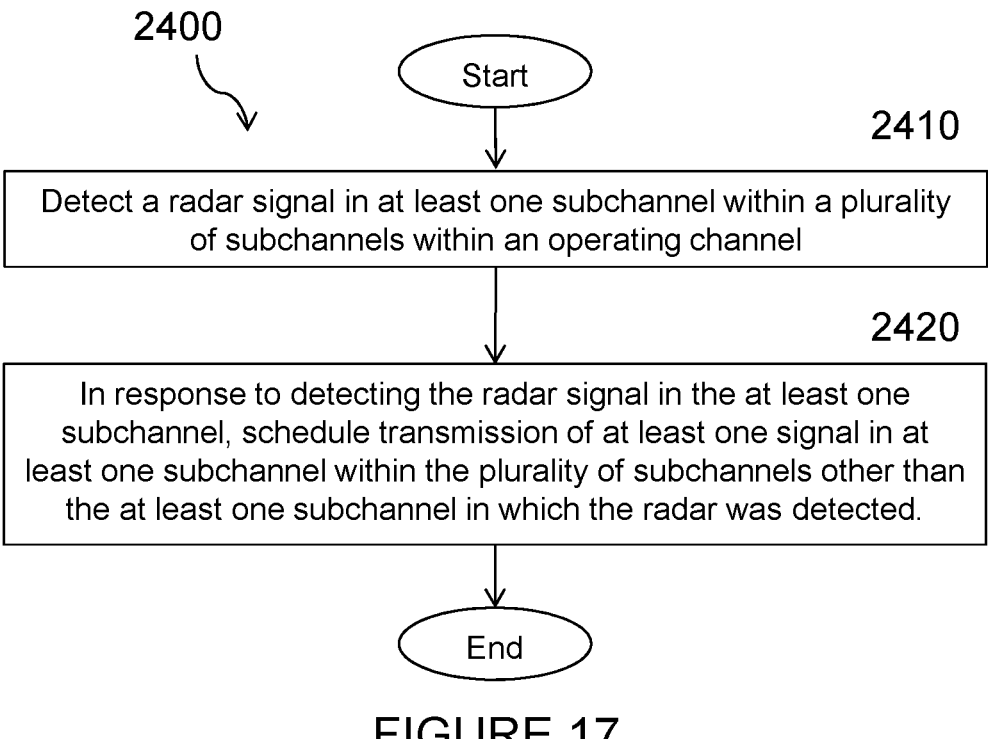
FIG. 17 illustrates an example method by a network node for adaptive bandwidth usage at radar congestion, according to certain embodiments.

FIG. 17 depicts a method 2400 by a network node 1360 for, according to certain embodiments. At step 2410, network node 1360 detects a radar signal in at least one subchannel within a plurality of subchannels within an operating channel. At step 2420, in response to detecting the radar signal in the at least one subchannel, network node 1360 schedules transmission of at least one signal in at least one subchannel within the plurality of subchannels other than the at least one subchannel in which the radar signal was detected.

In a particular embodiment, the operating channel comprises a total bandwidth, and the network node 1360 divides the operating channel into the plurality of subchannels. Each subchannel is associated with a portion of the total bandwidth.

In a particular embodiment, detecting the radar signal in the at least one subchannel within the plurality of subchannels within the operating channel includes performing, by the network node, one DFS procedure on the total bandwidth of the operating channel.

In a particular embodiment, when detecting the radar signal in the at least one subchannel within the plurality of subchannels within the operating channel, the network node 1360 performs one of a plurality of DFS procedures on each of the plurality of subchannels within the operating channel.

In a particular embodiment, the operating channel includes a total number of contiguous physical resource blocks, and network node 1360 divides the total number of physical resource blocks into a plurality of groups of distinct physical resource block groups.

In a particular embodiment, the operating channel includes a total number of resource units, and network node 1360 divides the total number of resource units into a plurality of groups of distinct resource unit groups.

In a particular embodiment, each resource unit comprises one or more OFDM tones.

In a particular embodiment, each of the plurality of subchannels are associated with a respective one of a plurality of subcarriers.

In a particular embodiment, network node 1360 allocates at least one resource for the transmission of the at least one signal in the at least one subchannel other than the at least one subchannel in which the radar signal was detected.

In a particular embodiment, network node 1360 transmits a message to a wireless device. The message indicates the at least one resource for the transmission of the at least one signal on the at least one subchannel other than the at least one subchannel in which the radar signal was detected.

In a particular embodiment, when scheduling the transmission of the at least one signal in the at least one subchannel other than the at least one subchannel in which the radar signal was detected, network node 1360 replaces a previous allocation of at least one resource associated with the at least one subchannel in which the radar signal was detected with a new allocation of at least one resource associated with the at least one subchannel other than the at least one subchannel in which the radar signal was detected.

In a particular embodiment, network node 1360 ceases transmission of at least one signal in the at least one subchannel in which the radar signal was detected in response to detecting the radar signal.

In a particular embodiment, the at least one signal comprises a network signal, and the network node 1360 determines that the radar signal interferes with the network signal scheduled for transmission within the at least one subchannel and transmits, to at least one wireless device, a message comprising a new configuration for the channel, the new configuration excluding the at least one subchannel in which the radar signal was detected.

In a particular embodiment, when transmitting the message including the new configuration for the channel to the at least one wireless device, network node 1360 transmits the new configuration to all wireless devices in a cell.

In a particular embodiment, the at least one signal comprises a synchronization signal or system information signal.

Figure 18:
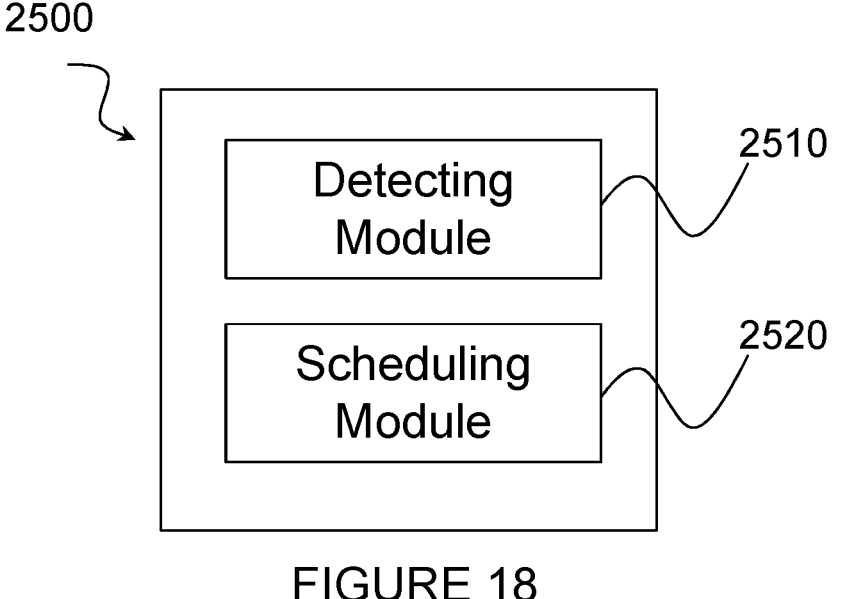
FIG. 18 illustrates an example virtual computing device for adaptive bandwidth usage at radar congestion, according to certain embodiments.

In a particular embodiment, prior to transmitting the new configuration, network node 1360 ceases transmission of all signals within the plurality of subchannels to eliminate interference with the radar signal and resumes transmission after the new configuration is transmitted to the wireless device. FIG. 18 illustrates a schematic block diagram of a virtual apparatus 2500 in a wireless network (for example, the wireless network shown in FIG. 6). The apparatus may be implemented in a wireless device or network node (e.g., wireless device 1310 or network node 1360 shown in FIG. 6). Apparatus 2500 is operable to carry out the example method described with reference to FIG. 17 and possibly any other processes or methods disclosed herein. It is also to be understood that the method of FIG. 17 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting module 2510, scheduling module 2520, and any other suitable units of apparatus 2500 to perform corresponding functions according one or more embodiments of the present disclosure.

According to certain embodiments, detecting module 2510 may perform certain of the detecting functions of the apparatus 2500. For example, detecting module 2510 may detect a radar signal in at least one subchannel within a plurality of subchannels within an operating channel.

According to certain embodiments, scheduling module 2520 may perform certain of the scheduling functions of the apparatus 2500. For example, scheduling module 2520 may, in response to detecting the radar signal in the at least one subchannel, schedule transmission of at least one signal in at least one subchannel within the plurality of subchannels other than the at least one subchannel in which the radar signal was detected.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FIG. 19 depicts another method 2600 by a network node 1360, according to certain embodiments. The method begins at step 2610 when network node 1360 detects a signature of a primary user in at least one subchannel within a plurality of subchannels within an operating channel. At step 2620, in response to detecting the signature of the primary user in the at least one subchannel, network node 1360 schedules transmission of at least one signal in at least one subchannel within the plurality of subchannels other than the at least one subchannel in which the signature of the primary user was detected.

As used herein, the term 'signature' may include any In a particular embodiment, the signature may include an identification signal. The term 'identification signal' as used herein may refer to an identification signal as used by the FCC. For example, at 60 GHz, FCC rules define an 'identification signal' to permit other users experiencing interference from indoor wireless local area network (LAN) devices to more accurately identify the source of the interference. Thus, an 'identification signal' may include any valid signature causing the proposed subchannel muting operation. The FCC proposed similar requirements for white space devices which transmit an identification signal that can be used to not transmit on active channels. Accordingly, in a particular embodiment, the methods described herein may be used to detect WSD identification signals to subsequently mute sub-channels so as to not interfere with the incumbent WSD.

In a particular embodiment, the signature comprises at least one of a preamble, a level of burstiness, a bandwidth, at least one time or frequency parameter of the primary user.

In a particular embodiment, the operating channel includes a total bandwidth, and network node 1360 divides the operating channel into the plurality of subchannels. Each subchannel is associated with a portion of the total bandwidth.

In a particular embodiment, the operating channel includes a total number of contiguous physical resource blocks, and network node 1360 divides the total number of physical resource blocks into a plurality of groups of distinct physical resource block groups.

In a particular embodiment, the operating channel includes a total number of resource units, and network node 1360 divides the total number of resource units into a plurality of groups of distinct resource unit groups.

In a particular embodiment, each resource unit comprises one or more OFDM tones.

In a particular embodiment, each of the plurality of subchannels are associated with a respective one of a plurality of subcarriers.

In a particular embodiment, network node 1360 allocates at least one resource for the transmission of the at least one signal in the at least one subchannel other than the at least one subchannel in which the signature of the primary user was detected.

In a particular embodiment, network node 1360 ceases transmission of at least one signal in the at least one subchannel in which the signature of the primary user was detected in response to detecting the signature.

FIG. 20 illustrates a schematic block diagram of another virtual apparatus 2700 in a wireless network (for example, the wireless network shown in FIG. 6). The apparatus may be implemented in a wireless device or network node (e.g., wireless device 1310 or network node 1360 shown in FIG. 6). Apparatus 2700 is operable to carry out the example method described with reference to FIG. 19 and possibly any other processes or methods disclosed herein. It is also to be understood that the method of FIG. 19 is not necessarily carried out solely by apparatus 2700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting module 2710, scheduling module 2720, and any other suitable units of apparatus 2700 to perform corresponding functions according one or more embodiments of the present disclosure.

According to certain embodiments, detecting module 2710 may perform certain of the obtaining functions of the apparatus 2700. For example, detecting module 2710 may detect a signature of a primary user in at least one subchannel within a plurality of subchannels within an operating channel.

According to certain embodiments, scheduling module 2720 may perform certain of the scheduling functions of the apparatus 2700. For example, scheduling module 2720 may, in response to detecting the signature of the primary user in the at least one subchannel, schedule transmission of at least one signal in at least one subchannel within the plurality of subchannels other than the at least one subchannel in which the signature of the primary user was detected.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

At least some of the following abbreviations may be used in this disclosure. If there is an inconsistency between abbreviations, preference should be given to how it is used above. If listed multiple times below, the first listing should be preferred over any subsequent listing(s):

1×RTT CDMA2000 1×Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel CA Carrier Aggregation
CC Carrier Component
CCA Clear Channel Assessment
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided
    by the power density in the band
CPRI Common Public Radio Interface
CQI Channel Quality information
C-RNTI Cell RNTI
CSI Channel State Information
DCCH Dedicated Control Channel
DFS Dynamic Frequency Selection
DFT Discrete Fourier Transform
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
EARFCN E-UTRA Absolute Radio Frequency Channel
    Number
ECGI Evolved CGI
eMBB Enhanced Mobile BroadBand
eNB E-UTRAN NodeB or Evolved Node B
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access
    Network
FDD Frequency Division Duplex
FFS For Further Study
FFT Fast Fourier Transform
GERAN GSM EDGE Radio Access Network
gNB gNode B (a base station in NR; a Node B supporting
    NR
and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LAA Licensed Assisted Access
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single
    Frequency Network
MBSFN ABS MBSFN Almost Blank Subframe
MDT Minimization of Drive Tests
MIB Master Information Block
MME Mobility Management Entity
MSC Mobile Switching Center
NGC Next Generation Core NPDCCH Narrowband Physical Downlink Control Chan-
    nel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAC Radio Access Controller
RAN Radio Access Network
RANAP Radio Access Network Application Part
RAT Radio Access Technology
RF Radio Frequency
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
    Signal Received Power
RSRQ Reference Signal Received Quality OR Reference
    Symbol Received Quality
RSSI Received Signal Strength Indicator
RSTD Reference Signal Time Difference
RWR Release with Redirect
SCH Synchronization Channel
SCell Secondary Cell
SCS Subcarrier Spacing
SDU Service Data Unit
SFN System Frame Number
SGW Serving Gateway
SI System Information
SIB System Information Block
SNR Signal to Noise Ratio
S-NSSAI Single Network Slice Selection Assistance
    Information
SON Self Optimized Network
SS Synchronization Signal
SSS Secondary Synchronization Signal
TBS Transport Block Size
TDD Time Division Duplex
TDOA Time Difference of Arrival
TOA Time of Arrival

31

$T_s$ Sample time/duration

TSS Tertiary Synchronization Signal

TTI Transmission Time Interval

UE User Equipment

UL Uplink

UMTS Universal Mobile Telecommunication System

USIM Universal Subscriber Identity Module

UTDOA Uplink Time Difference of Arrival

UTRA Universal Terrestrial Radio Access

UTRAN Universal Terrestrial Radio Access Network

WCDMA Wide CDMA

WLAN Wide Local Area Network

The invention claimed is:

1. A method performed by a network node, the method comprising:

detecting a radar signal in at least a first subchannel within a plurality of subchannels within an operating channel used by at least one wireless device, wherein the first subchannel includes a synchronization signal or system information; and in response to detecting the radar signal in at least the first subchannel, scheduling transmission of at least one signal in at least a second subchannel of the plurality of subchannels within the operating channel that is different from the at least first subchannel in which the radar signal was detected, wherein the at least one signal comprises the synchronization signal or system information signal;

allocating at least one resource for the transmission of the synchronization signal or system information signal in the at least second subchannel other than the at least first subchannel in which the radar signal was detected; and transmitting, to the at least one wireless device, a message comprising a new configuration for the at least second subchannel, the new configuration excluding the at least first subchannel in which the radar signal was detected and indicating the at least one resource for the transmission of the synchronization signal or system information signal on the at least second subchannel to enable the at least one wireless device to continue using the operating channel without the at least first subchannel in which the radar signal was detected.

2. A network node comprising:

processing circuitry configured to:

detect a radar signal in at least a first subchannel within a plurality of subchannels within an operating channel used by at least one wireless device, wherein the first subchannel includes a synchronization signal or system information; and in response to detecting the radar signal in at least the first subchannel, schedule transmission of at least one signal in at least a second subchannel of the plurality of subchannels within the operating channel that is different from the at least first subchannel in which the radar signal was detected;

wherein the at least one signal comprises the synchronization signal or system information signal;

allocate at least one resource for the transmission of the synchronization signal or system information signal in the at least second subchannel other than the at least first subchannel in which the radar signal was detected; and transmit, to the at least one wireless device, a message comprising a new configuration for the at least second subchannel, the new configuration excluding the at least first subchannel in which the radar signal was detected and indicating the at least one resource for the transmission of the synchronization signal or system information signal on the at least second subchannel to enable the at least one wireless device to continue using the operating channel without the at least first subchannel in which the radar signal was detected.

3. The network node of claim 2 wherein the operating channel comprises a total bandwidth, and the processing circuitry is configured to divide the operating channel into the plurality of subchannels, wherein each subchannel is associated with a portion of the total bandwidth.

4. The network node of claim 3, wherein when detecting the radar signal in the at least first subchannel within the plurality of subchannels within the operating channel the processing circuitry is configured to perform one Dynamic Frequency Selection (DFS) procedure on the total bandwidth of the operating channel.

5. The network node of claim 3, wherein when detecting the radar signal in the at least first subchannel within the plurality of subchannels within the operating channel the processing circuitry is configured to perform one of a plurality of DFS procedures on each of the plurality of subchannels within the operating channel.

6. The network node of claim 3, wherein:

the operating channel comprises plurality of channels comprise a total number of contiguous physical resource blocks, and when dividing the operating channel into the plurality of subchannels the processing circuitry is configured to divide the total number of physical resource blocks into a plurality of groups of distinct physical resource block groups.

7. The network node of claim 3, wherein:

the operating channel comprises a total number of resource units, and when dividing the operating channel into the plurality of subchannels the processing circuitry is configured to divide the total number of resource units into a plurality of groups of distinct resource unit groups.

8. The network node of claim 7, wherein each resource unit comprises one or more OFDM tones.

9. The network node of claim 2, wherein each of the plurality of subchannels are associated with a respective one of a plurality of subcarriers.

10. The network node of claim 2, wherein when scheduling the transmission of the at least one signal in the at least second subchannel other than the at least first subchannel in which the radar signal was detected the processing circuitry is configured to replace a previous allocation of at least one resource associated with the at least first subchannel in which the radar signal was detected with a new allocation of at least one resource associated with the at least second subchannel other than the at least first subchannel in which the radar signal was detected.

11. The network node of claim 2, wherein the processing circuitry is configured to cease transmission of at least one signal in the at least first subchannel in which the radar signal was detected in response to detecting the radar signal.

12. The network node of claim 2, wherein the at least one signal comprises a network signal, and the processing circuitry is configured to:

determine that the radar signal interferes with the network signal scheduled for transmission within the first subchannel.

13. The network node of claim 2, wherein when transmitting the message comprising the new configuration for the channel to the at least one wireless device the processing circuitry is configured to transmit the new configuration to all wireless devices in a cell.

14. The network node of claim 2, wherein the processing circuitry is configured to:

prior to transmitting the new configuration, cease transmission of all signals within the plurality of subchannels to eliminate interference with the radar signal; and resume transmission of the at least one signal in at least the second subchannel after the new configuration is transmitted to the wireless device.

* * * * *